United States Patent [19]

Thomas et al.

[11] Patent Number: 4,779,633

[45] Date of Patent: Oct. 25, 1988

[54] APPARATUS FOR THE CARE OF CONTACT LENSES

[75] Inventors: Peter Thomas, Wuppertal; Hans-Joachim Reitz, Roesrath; Udo Schaab, Korschenbroich; Klaus-Dieter Wisotzki, Erkrath, all of Fed. Rep. of Germany

[73] Assignee: Henkel Kommanditgesellschaft auf Aktien, Duesseldorf, Fed. Rep. of Germany

[21] Appl. No.: 69,794

[22] Filed: Jul. 6, 1987

[30] Foreign Application Priority Data

Nov. 15, 1986 [DE] Fed. Rep. of Germany ....... 3639101

[51] Int. Cl.$^4$ .............................................. B08B 3/10
[52] U.S. Cl. .................... 134/93; 134/184; 134/196
[58] Field of Search .................... 134/1, 93, 184, 186, 134/196, 197, 143; 366/127; 137/268; 206/5, 5.1; 422/292, 297, 300; 68/355

[56] References Cited

U.S. PATENT DOCUMENTS

| | | | |
|---|---|---|---|
| 2,776,558 | 1/1957 | Vang | 68/355 X |
| 3,139,097 | 6/1964 | Hungerford et al. | 134/197 X |
| 3,151,846 | 10/1964 | George | 134/184 X |
| 3,545,458 | 12/1970 | Korb | 134/197 |
| 3,586,012 | 6/1971 | Paule | 134/93 |
| 3,623,492 | 11/1971 | Frantz et al. | 134/143 |
| 3,871,395 | 3/1975 | Murry | 134/184 X |
| 4,157,922 | 6/1979 | Luik | 134/197 X |
| 4,249,562 | 2/1981 | King, Sr. | 137/268 |
| 4,597,399 | 7/1986 | Rabenau et al. | 134/184 |
| 4,691,725 | 9/1987 | Parisi | 134/1 X |
| 4,700,729 | 10/1987 | Thaler | 134/143 |

FOREIGN PATENT DOCUMENTS

| | | |
|---|---|---|
| 31152 | 7/1981 | European Pat. Off. . |
| 2507335 | 9/1976 | Fed. Rep. of Germany . |
| 2925750 | 6/1981 | Fed. Rep. of Germany . |
| 3106519 | 10/1982 | Fed. Rep. of Germany . |
| 3410400 | 9/1985 | Fed. Rep. of Germany . |

*Primary Examiner*—Harvey C. Hornsby
*Assistant Examiner*—Frankie L. Stinson
*Attorney, Agent, or Firm*—Ernest G. Szoke; Henry E. Millson, Jr.; Real J. Grandmaison

[57] ABSTRACT

Apparatus for the care of contact lenses comprising a housing, a chamber in a lower part of the housing for containing a treatment liquid, a vibration generator for agitating the treatment liquid, a contact lens holder for holding contact lenses in said chamber optionally having means for holding a treatment tablet to be dissolved in the treatment liquid, and means for coupling the contact lens holder to the vibration generator and for positioning the contact lens holder in the treatment liquid.

16 Claims, 2 Drawing Sheets

APPARATUS FOR THE CARE OF CONTACT LENSES

BACKGROUND OF THE INVENTION

1. Field of the Invention

This invention relates to an apparatus for the care of contact lenses comprising a chamber for containing a treatment liquid, a contact lens holder for immersion in the treatment liquid, and means for agitating the treatment liquid.

2. Description of Related Art

In known devices of this type (German Patent Publication No. OS 34 10 400 and U.S. Pat. No. 3,623,492), the treatment liquid is agitated by rotation of the contact lens holder, rotation being effected manually by means of a rotatably mounted cover and gearing between the cover and the contact lens holder. In this arrangement agitation or stirring of the treatment liquid is relatively limited and, for this reason, so is the washing of the contact lenses and the dissolution of any tablets or powders in the treatment liquid. Manual operation has proved unsatisfactory in practice.

Devices for ultrasonically cleaning contact lenses also are known (German Patent Publication Nos. OS 25 07 335, 29 25 750 and 13 06 519, and European Pat. No. 031 152). However, because their manufacture is relatively complicated and costly, ultrasonic cleaning devices are too expensive for general use. Furthermore, such devices are not easy to use, particularly while traveling, and, stresses produced by ultrasonic treatment also may result in damage to the contact lenses.

Accordingly, it has been proposed in copending application Ser. No. 069,672 filed on July 6, 1987 which is hereby incorporated by reference, to surrounds the contact lens holder in the container for the treatment liquid—the multiple-part housing with an electric motor and gearing for driving the stirrer in one part of the housing and a battery for powering the motor positioned in another part of the housing.

BRIEF DESCRIPTION OF THE DRAWINGS

The invention is described hereinafter in detail with reference to the accompanying drawings, wherein.

DESCRIPTION OF THE INVENTION

Figure 1:
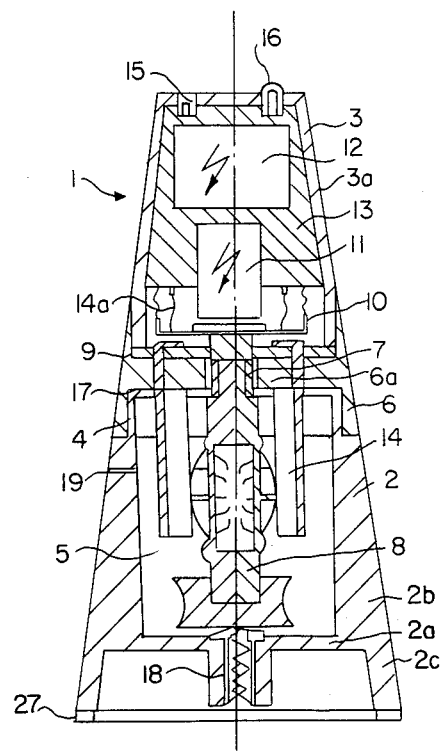
FIG. 1 is a vertical sectional view of a device according to the invention.

An object of the present invention is to provide a device which, similar to the device of application, Ser. No. 069,672, mentioned above is more easy to use and accelerates and improves the quality of cleaning and disinfecting or sterilizing for contact lenses relative to prior art arrangements. The present device is particularly simple and compact in design and, hence, inexpensive to manufacture. The device also accelerates the dissolution of tablets introduced into the treatment liquid, particularly the so-called two-component tablets.

These and other objects are achieved in accordance with this invention by a device for cleaning and sterilizing contact lenses comprising a housing, a chamber in a lower part of said housing for containing a treatment liquid, a contact lens holder for holding contact lenses in said chamber and for optionally holding treatment materials adapted to be dissolved in said treatment liquid, a vibration generator for agitating the treatment liquid and means for coupling the contact lens holder to the vibration generator and for positioning the contact lens holder in the treatment liquid. Preferably, the vibration generator comprises an electromagnetic coil having operatively associated therewith an armature to which the contact lens holder is coupled.

In the illustrated embodiment of the invention, the electromagnetic coil with the armature is mounted in an upper part of the housing above the chamber for the treatment liquid which is formed in the lower part of the housing. A coupling member extends through a rubber sealing membrane from the upper part of the housing downwardly into the chamber for the treatment liquid and couples the contact lens holder to the armature. Preferably, the upper and lower parts of the housing are releasably interconnected, for example, by a threaded connection, and the contact lens holder is releasably connected to the coupling member, such as by a bayonet joint.

The electromagnetic coil and an electronic control unit associated therewith may be embedded individually or together in a potting compound in the upper part of the housing.

Heating elements also may be provided extending through the rubber sealing membrane into the treatment chamber in the lower part of the housing.

As shown, the contact lens holder is formed with a horizontally extending bore to receive a treatment tablet, for example, a so-called two-component tablet having two active materials that dissolve at different rates in the treatment liquid to provide first a cleaning and sterilizing solution and then a neutralizing solution. The treatment tablet, which becomes smaller as it dissolves, is supported in the bore by spring fingers on opposite sides of the bore. The springs hold the tablet in position in the contact lens holder for as long as possible to prevent relatively large pieces of the tablet from dropping out and settling on the bottom of the chamber.

The contact lens holder also is preferably provided on both sides with a convex lens receiving surface and lens retaining cups or closure members for holding the contact lenses in place during treatment. Openings provided between the bore and the closure members in the contact lens holder facilitate the flow of the cleaning and sterilizing solution and the neutralizing solution directly from the bore where the tablet is dissolved to the surfaces of the contact lenses.

To facilitate handling of the contact lens holder, a base plate having a concave side wall may be attached to the lower end of the lens holder. A filling valve which communicates with the treatment chamber also may be provided in the lower part of the housing for introducing treatment liquid into the chamber from a pressurized supply source, such as an aerosol can. A non-slip material, such as expanded rubber, may be provided on the support contacting surface of the apparatus to eliminate slippage and reduce any lateral movement of the apparatus due to vibration as it is operated. To improve the stability and slip resistance of the apparatus, the housing may be frustoconical in shape to create a larger base and thus a larger supporting surface.

The apparatus shown in the drawings comprises a frustoconical housing 1 with a pedestal-like lower part 2 preferably made of a transparent plastic and an upper part 3 releasably connected to lower part 2 through threaded connection 4. Lower part 2 of the housing has a treatment chamber 5 for retaining a treatment liquid and the treatment chamber is enclosed at the top by base 6 of upper part 3. A ring seal 17 is provided between lower and upper parts 2 and 3 of the housing to seal chamber 5. Base 6 includes a plate 6a through which a downwardly-open coupling member 7 extends for receiving and securing contact lens holder 8, for example, by a bayonet joint (not shown).

Coupling member 7 extends upwardly into upper part 3 of housing 1 through a rubber membrane 9 which seals the upper and lower parts of the housing from one another. At its upper end, the coupling member is fixed to armature 10 of an electromagnetic coil 11, which in turn is embedded, together with an electronic control unit 12, in potting compound 13 in the cap 3a of upper part 3 of housing 1. For facilitating manufacturing of the device, the upper part of the housing is formed of two pieces. Base 6 comprises one piece and, cap 3a the other. After introduction of the elements to be accommodated in the cap 3a of upper part 3 of the housing, including coil 11 and control unit 12, base 6 is firmly joined, preferably by an adhesive bond, to the cap.

Heating elements 14 are positioned around contact lens holder 8. These elements are connected by wires 14a to electronic control unit 12, and also extend through rubber membrane 9 in a liquid-tight manner and through base 6, into treatment chamber 5 in the lower part of the housing. An electrical connection 15 for supplying power to the device and a pilot lamp 16 are provided on the upper side of cap 3a. A filling valve 18 is provided through the bottom wall 2a of lower part 2 for introducing treatment liquid into chamber 5 under pressure, for example, from an aerosol can. A pressure relief or safety valve 19 is provided in the side wall 2b of the lower part 2 for releasing excess pressure that may develop in chamber 5.

Side wall 2b extends below bottom wall 2a to form a leg portion 2c for supporting housing 1. The bottom edge of leg portion 2c has a covering of a non-slip resistance of the housing relative to the supporting surface. In the illustrated embodiment bottom wall 2a is spaced from the supporting surface a sufficient amount to accommodate filling valve 18.

Figure 4:
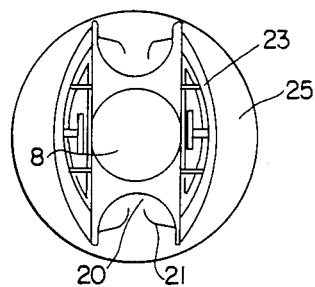
FIG. 4 is a plan view of the contact lens holder shown in FIG. 3.
Figures 2, 3:
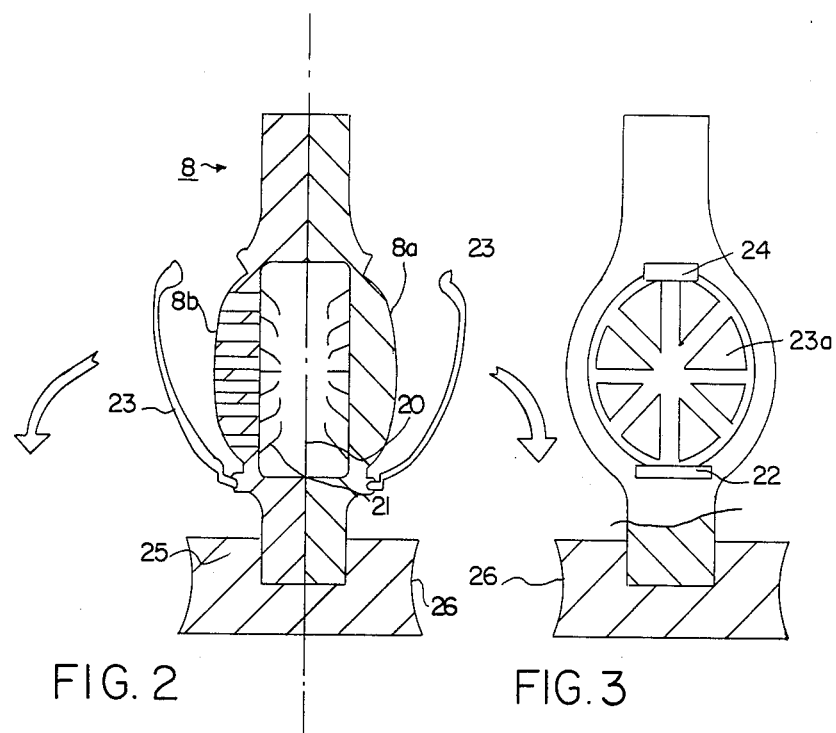
FIG. 2 is a vertical sectional view on a larger scale through the contact lens holder of FIG. 1.
FIG. 3 is a side elevation view, partly in section, of the contact lens holder shown in FIG. 2.

As shown in FIGS. 2 and 4, a horizontally extending bore 20 is formed through contact lens holder 8. Contact lens holder 8 preferably is manufactured in two parts. Small springs 21, in the form of spring fingers, extend inwardly from the sides of the bore 20 and are positioned to retain treatment tablets inserted laterally into the bore. Outer surfaces 8a of the contact lens holder 8 are convexly shaped on both sides of bore 20 to accommodate the contact lenses. Closure members 23 have concave mating surfaces overling surfaces 8a of contact lens holder 8 forming lens retaining cups for holding the lenses in place. Closure members 23 have large openings 23a and are pivotally mounted on lens holder 8 by a hinge 22 at the bottom thereof. Closure members 23 are held in a closed position by a latch 24 at the top thereof. Bores 8b are formed in contact lens holder 8 on both sides of bore 20 (illustrated on only one side in FIG. 2). Bores 8b open at surfaces 8a near where the contact lenses are positioned so that, as a tablet positioned in bore 20 is dissolved, the resulting solution can flow directly to the surfaces of the contact lenses.

At the lower end of contact lens holder 8, a base plate 25 is provided for supporting the lens holder in an upright position. Base plate 25 preferably is provided with a concave sidewall 26 to facilitate the handling of the lens holder when it is removed from coupling member 7.

To use the apparatus in the care of contact lenses, upper part 3 of the housing first is separated from lower part 2 at threaded connection 4 and contact lens holder 8 is released from coupling member 7. Contact lenses then are placed on surfaces 8a of lens holder 8 and closure members 23 are closed and latched. A treatment tablet is inserted laterally into bore 20 and a liquid such as a saline solution, distilled water or even tap water is poured into chamber 5 in lower part 2 of housing 1 to a desired level. Contact lens holder 8 then is attached to coupling member 7, and upper part 3 of housing 1 is threaded onto lower part 2. The device now is ready for operation. In an alternate embodiment, the device is assembled with the treatment tablet in place before filling chamber 5 with liquid. Chamber 5 then is filled through filling valve 18.

The time required for a cleaning cycle depends upon the nature of the treatment. It is possible to use two separate treatment liquids. Initially, chamber 5 can be filled with a cleaning and sterilizing liquid. After a period of vibration, the chamber is emptied and then recharged with a neutralizing solution, followed by another period of vibration. In a preferred process, however, materials for forming both a sterilizing and cleaning solution and a subsequent neutralizing solution are introduced at the outset for example as a two-component treatment tablet. The two-component treatment tablet is so designed that the material which initially dissolves forms the sterilizing and cleaning solution and after a certain time interval, additional material dissolves forming the neutralizing solution. Alternatively, the tablet may comprise material only for forming a neutralizing solution, while the cleaning and sterilizing solution initially is added as a liquid per se. The dissolution of the tablet is delayed for a time sufficient to complete the cleaning and sterilization treatment.

Although certain embodiments of the invention have been described in detail, the described embodiment may of course be modified or extended in many ways without departing from the basic concept of the invention. Thus, heating elements 14 could be omitted. Electronic controls 12, which normally include a time control for the electromagnetic coil and the heating elements, also may be omitted depending on the treatment to be applied. Alternatively, electronic controls 12 can be designed to control the vibration frequency of the magnetic coil and the heating as a function of the progress of the treatment process. In any event, the scope of the invention is defined in the appended claims.

We claim:

1. An apparatus for the care of contact lenses comprising a housing, a chamber in a lower part of said housing for containing a treatment liquid, a vibration generator for agitating the treatment liquid which comprises an electromagnetic coil positioned in an upper part of said housing, said coil having operatively associated therewith an armature to which said contact lens holder is coupled, a contact lens holder which includes means for holding a treatment tablet for dissolution in the treatment liquid and for holding contact lenses in said chamber, and means for coupling said contact lens holder to said vibration generator and for positioning said contact lens holder in said treatment liquid.

2. An apparatus in accordance with claim 1 wherein said armature is releasably coupled to said contact lens holder by a coupling member fixed to said armature, said coupling member extending downwardly through a sealing member into said lower part of said housing.

3. An apparatus in accordance with claim 2 in which the upper part and lower part of the housing are releasably interconnected.

4. An apparatus in accordance with claim 3 wherein the upper part and lower part of the housing are releasably interconnected by a threaded connection.

5. An apparatus in accordance with claim 2 wherein said electromagnetic coil and an electronic control unit for controlling the operation of said electromagnetic coil are embedded in a potting compound in the upper part of said housing.

6. An apparatus in accordance with claim 2 having heating means extending through said sealing member and positined in said chamber.

7. An apparatus in accordance with claim 2 having a filling valve in the lower part of the housing for introducing treatment liquid under pressure into said chamber.

8. An apparatus in accordance with claim 2 having a safety valve provided in the lower part of said housing.

9. An apparatus in accordance with claim 2 wherein said housing is frustoconically shaped.

10. An apparatus in accordance with claim 1 wherein said holding means comprises a horizontally extending bore with means for supporting a treatment tablet in said bore for dissolution in said treatment liquid.

11. An apparatus in accordance with claim 10 wherein said means for supporting comprises spring fingers on the sides of said bore for positioning a treatment tablet in said bore as it dissolves.

12. An apparatus in accordance with claim 10 wherein said contact lens holder is provided on either side of said bore with lens retaining cups, said contact lens holder having openings which connect said bore to said cups.

13. An apparatus in accordance with claim 10 wherein a substantially circular base plate is attached to the lower end of the contact lens holder.

14. An apparatus in accordance with claim 13 wherein said substantially circular base plate has concave side walls.

15. An apparatus in accordance with claim 1 further comprising a non-slip material provided on the support contacting surface of said housing.

16. An apparatus in accordance with claim 15 wherein said non-slip material is expanded rubber.

* * * * *